Patented Nov. 17, 1953

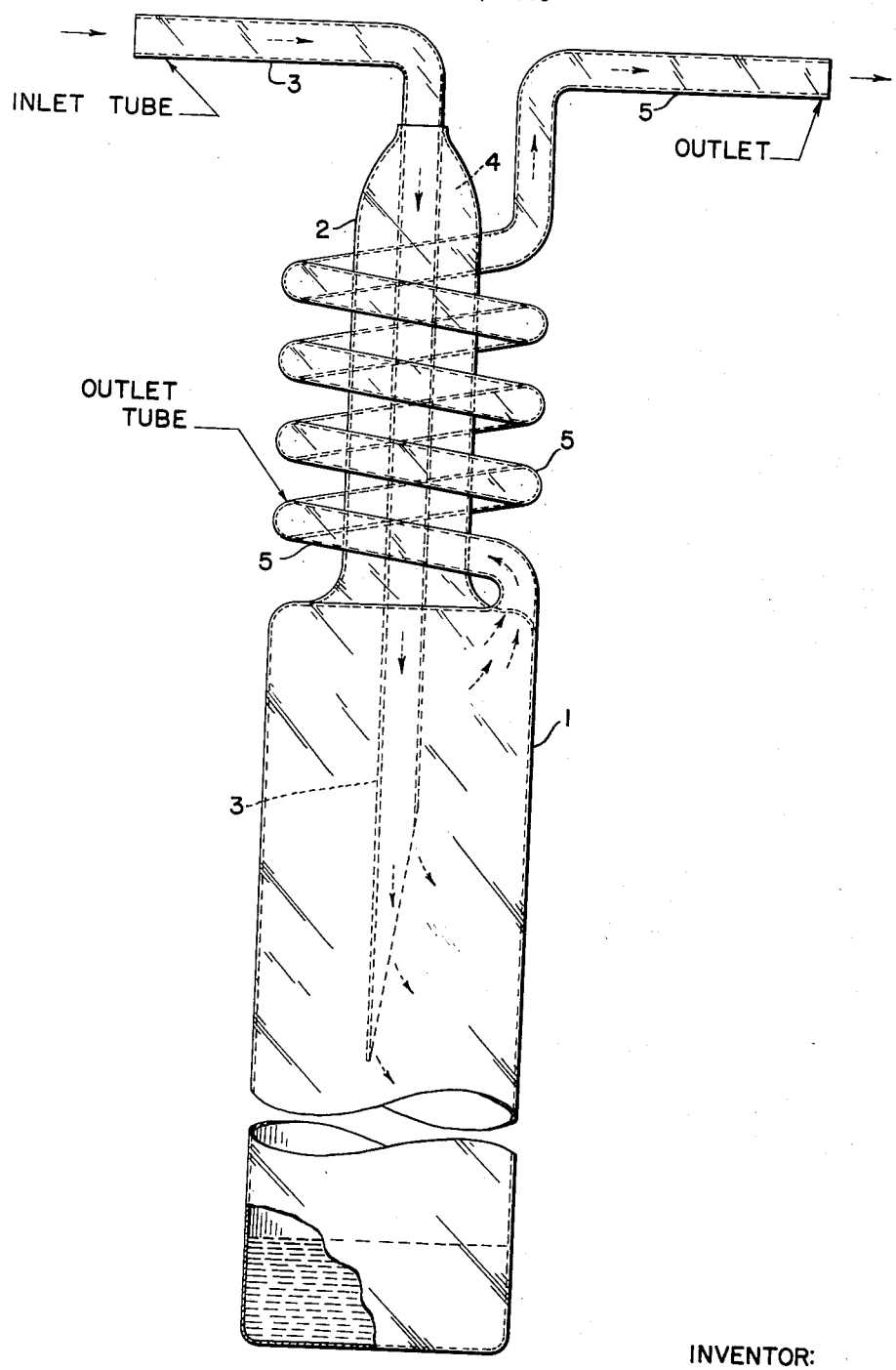

2,659,452

UNITED STATES PATENT OFFICE 2,659,452

CONDENSATE TRAP

Alexander Gaydasch, Broadview, Ill., assignor to Universal Oil Products Company, Chicago, Ill., a corporation of Delaware Application February 28, 1951, Serial No. 213,224

3 Claims. (Cl. 183—106)

This invention relates to an improved trap for collecting condensate in a gas or vapor stream, and more particularly to a trap of the type connecting with a vacuum line and adapted for immersion in or enclosure within a cooling medium in order to collect and remove water or low boiling vapors from the gaseous stream.

In the construction and arrangement of the usual form of condensate trap, the inlet and outlet lines to the condensate collecting chamber of the trap are at substantially the same level, or alternatively, the gas inlet line connects vertically with the upper end of the collecting chamber while the gas outlet line from the chamber extends from the upper portion thereof and winds around a vertical portion of the gas inlet tube. Thus, when this type of trap is immersed in an iced liquid or cooling medium, the inlet tube, or at least, the portion thereof in the zone of the condensate chamber, has its exterior in direct contact with the cooling medium so that condensate may form ice and plug the inlet line to the trap.

It is thus a principal object of the present invention to provide an improved construction for a condensate trap which prevents passing the inlet tube in contact with a cooling medium in which the trap may be immersed and thereby prevent icing and plugging of condensate within the inlet tube itself.

It is a further object and feature of the present invention to provide a condensate trap which has a jacketed space around the gas inlet tube by extending a portion of the chamber itself along the axis of the inlet tube and spaced therefrom in a manner preventing actual contact between the gas inlet tube and the cooling medium itself.

Briefly, the improved condensate trap of my invention provides a trap chamber or body section with a gas inlet tube extending into the interior thereof, an elongated jacketing portion of the chamber extending along and spaced from the gas inlet tube in a manner providing an annular space between the tube and the extended portion of the chamber itself, and a gas outlet tube extending from the mid-portion of the chamber upwardly therefrom.

In effecting, for example, the vacuum distillation of a hydrocarbon charge stream, it is desirable to provide a condensate trap in the vacuum line leading to the vacuum pump, in order that there be no water or low boiling hydrocarbons drawn into the pump. The trap is usually immersed in a cooling medium, such as for example, a dry ice and acetone mixture suitable to effect a temperature of the order of −70° C. At this temperature, and in a trap of the usual construction, which permits the gas inlet line to come in contact with the cooling medium, there is a tendency to have condensation within the inlet line and plugging and blocking of the gas flow by the formation of ice.

It is a particular advantage of this improved trap construction to have a long upper portion of the chamber or an elongated body section of the condensate trap extend around and spaced from the gas inlet tube. Thus, with the gas outlet tube being connected to the mid portion of the condensate chamber, and vacuum applied to the chamber, there is provided a jacketed annular space around the inlet tube, as well as within the body portion of the condensate chamber that is under vacuum conditions. This evacuated space prevents the inlet stream from being subjected to the action of the external cooling mixture, by virtue of the insulating effect, and thereby substantially eliminates any freezing of condensate and plugging within the gas inlet run of the tubing.

In a preferred construction of the trap, an upper elongated portion of the chamber, which encompasses a major portion of the gas inlet tube, may be of a smaller diameter than that of the lower condensate collecting portion of the chamber. However, the smaller diameter jacketing portion of the trap should provide an ample evacuated annular space around the inlet tube so that the latter is well insulated from the cooling medium into which the entire condensate trap is immersed. Also, a preferred embodiment has an extended portion of the gas outlet tube, which connects to a mid portion of the condensate chamber, formed in an upwardly extending substantially helical coil. This provides an extended gas passageway which permits additional condensing surface for the cooled gas stream, and means for allowing any additional condensate to run back into the lower collecting chamber.

The construction and operation of the improved condensate trap of this invention will be better understood upon reference to the accompanying drawing and the following description thereof.

Referring now to the drawing, there is indicated an elongated vertically positioned chamber 1 suitable for receiving a gaseous inlet stream under vacuum. The chamber 1 is also adapted for placement in or immersion within a cooling medium so that water or other condensate from the gaseous stream may be collected within the lower portion thereof. This particular embodiment of the condensate trap has an elongated upper portion 2, which is of substantially smaller cross-sectional area than that of the lower portion of the chamber and provides means for encompassing a major portion of the gas inlet tube 3. The inlet tube 3 extends axially downwardly through the extended upper portion 2 of the chamber and into the lower enlarged portion of chamber 1. The concentric arrangement provides an annular space 4 around the inlet tube and maintains the inlet tube away from the outer wall of the condensate chamber. The annular space 4 not only prevents the inlet tube 3 from coming in contact with the cooling medium on the exterior of the condensate chamber 1, but in addition provides an evacuated space with the desirable insulating value thereof, when the interior of the chamber is under vacuum conditions.

A gas outlet tube 5 connects with the chamber 1 at a mid-point, or as indicated in the present embodiment of the drawing, at the zone where the chamber narrows into the upper smaller diameter section 2. The outlet tube 5 is also preferably of extended length, such as provided by the coiled portion surrounding the upper section 2, whereby a cooled gaseous stream has additional surface to permit condensate to collect and flow downwardly by gravity into the enlarged condensate collecting section of chamber 1.

As mentioned hereinbefore, the present condensate trap is adapted for immersion within a cooling medium or to being subjected to other external cooling means, so that the entire external portion of the elongated chamber as well as a portion of the outlet conduit or tube 5 is directly in contact with the cooling medium. However, where a major portion of the condensible material in the gas stream is condensed and collected within the chamber 1, only a small portion of additional condensate is collected within the coiled portion of outlet tube 5 and there is little or no chance for icing or plugging within that section. In the usual operation, the gaseous stream is under vacuum so that the annular space 4 around the upper portion of the inlet tube 3 is an evacuated space which provides a high degree of insulation for the enclosed portion of the inlet tube and preventing the low temperature cooling medium on the exterior of the trap from effecting icing and plugging of the inlet line by condensate which may otherwise form prior to reaching the lower portion of the condensate collecting chamber 1.

It is also a feature of the present embodiment of the improved condensate trap, to have the lower gas distributing end of the inlet tube 3 tapered or cut at a sharp angle with respect to the axis of the tube to provide substantially even dispersion of the gaseous stream from the end of the inlet tube. In other words, an elongated substantially vertical elliptical outlet is provided from which the inlet gaseous stream may disperse itself substantially laterally or transversely into the lower enlarged condensate collecting chamber. The tapered end of the inlet tube 3 also provides a relatively sharp lower point from which condensate may drip, for that portion of condensate which may form within the lower end of the tube itself.

It is not intended to limit the improved construction for the condensate trap to any particular size or shape. Although as indicated in the present illustrated embodiment, the lower chamber or body portion of the trap and the upper jacketing portion is adapted to be placed substantially vertically, the construction may alternatively have a diagonally or laterally positioned gas inlet tube and an elongated portion which jackets and insulates the gas inlet tube from the cooling medium for the entire portion of the inlet tube which might otherwise be in contact with the external cooling medium. However, in an embodiment having a gas inlet extending diagonally or substantially horizontally into the chamber of the trap and a jacketing section extending concentrically around the inlet tube, the gas outlet tube still preferably extends upwardly from the chamber in order to permit the drainage of any condensate in the outlet line.

The trap may be made of various materials, such as steel, alloy, ceramic, glass, or of various of the "plastic" materials, however, the chamber is of course made of a pressure tight construction and of material suitable to maintain a vacuum so that the gas stream may be put under vacuum for a vacuum distillation operation. When the condensate trap is of a small size such as used in the laboratory, both the tubing and the chamber portions thereof may well be made of glass.

I claim as my invention:

1. A condensate trap comprising an elongated cylindrical chamber having an enlarged cross-sectional area lower portion and smaller diameter upper portion, an inlet tube connecting with and extending axially downwardly through said chamber to the lower portion thereof, said inlet tube forming with the upper wall portion of said chamber an annular space jacketing said inlet tube, a gas outlet tube extending from said chamber at the top of said enlarged lower portion, and said outlet tube extending in a coil around the smaller upper portion of said chamber closely adjacent thereto.

2. The trap of claim 1 further characterized in that the lower end of said inlet tube terminates within the lower portion of said chamber in a long tapering end providing an elongated elliptical shaped gas outlet therefrom.

3. A condensate trap adapted for placement within a cooling medium, which comprises, a condensate collecting chamber having an enlarged portion and a communicating elongated jacketing portion of smaller cross-sectional area than said enlarged portion, a gas inlet tube extending longitudinally through said jacketing portion into said enlarged portion and spaced from the inner wall of the jacketing portion, and a gas outlet tube extending upwardly from said enlarged portion and coiled around the exterior of said jacketing portion.

ALEXANDER GAYDASCH.

References Cited in the file of this patent
UNITED STATES PATENTS

| Number | Name | Date |
|---|---|---|
| 568,145 | Sanderson | Sept. 22, 1896 |
| 856,088 | Newman | June 4, 1907 |
| 1,452,447 | Thatcher | Apr. 17, 1923 |
| 2,402,196 | Zeek | June 18, 1946 |
| 2,458,909 | John | Jan. 11, 1949 |